July 21, 1942.    D. E. DELANEY    2,290,677
GREASE GUN ADAPTER
Filed July 3, 1941
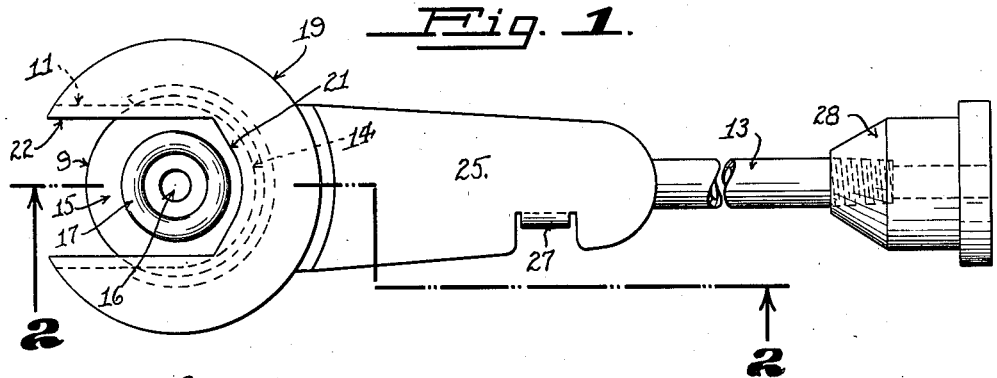
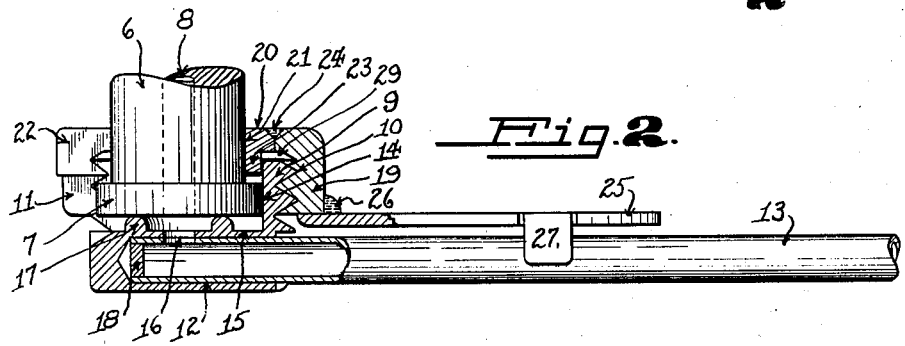
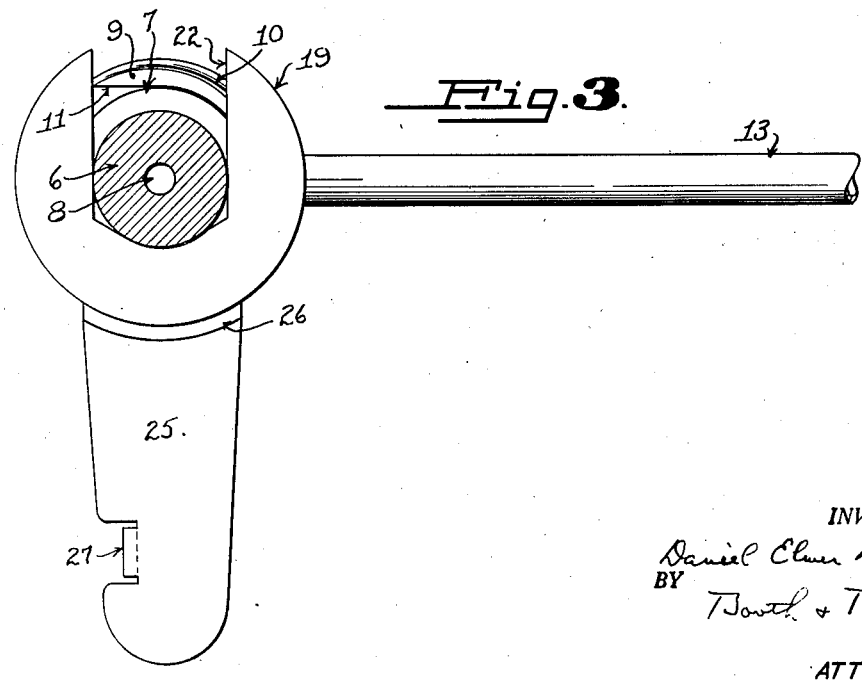
INVENTOR.
Daniel Elmer Delaney
BY
Booth & Booth
ATTORNEYS.

Patented July 21, 1942

2,290,677

UNITED STATES PATENT OFFICE 2,290,677

GREASE GUN ADAPTER

Daniel Elmer Delaney, El Paso, Tex.

Application July 3, 1941, Serial No. 400,920

5 Claims. (Cl. 285—143)

The present invention relates to a separable adapter for connecting a grease gun to grease fittings in inaccessible locations.

The crank pin bearings of steam locomotives are sometimes lubricated by a grease gun temporarily connected with grease fittings or plugs located in the ends of the crank pins or in the eyes of the side rods, and in some positions of the wheels, these plugs are inaccessible. This is particularly true of the crank pin of the forward driving wheel, which may come to rest in a position behind the main rod or behind the cross head, where the lateral clearance beyond the end of the grease plug is very small.

The principal object of the present invention is to provide an adapter or extension to which the grease gun can be connected, and which can be connected to the plug in positions of limited lateral clearance, in order to avoid moving the locomotive or spotting it with its wheels in certain positions. Another object is to provide an adapter that is easy and quick to use, and which will make a grease-tight connection with the plug. Still other objects and advantages of the invention will be apparent from the following description of a preferred embodiment thereof, which should be read with the understanding that the device is not limited to the particular use herein described, and that its form, construction and arrangement can be varied, within the limits of the claims hereto appended, without departing from the spirit of the invention.

Reference will be made to the accompanying drawing, wherein

Fig. 1 is a side elevation of the adapter as seen from the rear or inside, showing the locking device in open position, the grease plug being omitted.

Fig. 2 is a section on the line 2—2 of Fig. 1, showing the adapter in position on a grease plug, and the locking device open.

Fig. 3 is a view similar to Fig. 1 except that the locking device is shown in locked position ready for use, and the grease plug is shown in section.

The adapter comprises an angle fitting having a head portion which fits over and locks upon the grease plug from the side, and a tubular stem extending laterally from said head with means at its end to which the grease gun is connected. A portion of the grease plug is shown at 6 in the drawing, having the usual flange 7 at its outer end and a central grease passage 8. The head of the adapter has a body member 9 with an exterior coarse thread 10. The interior of said body is bored out to a diameter slightly larger than that of the flange 7 on the plug, and said body is cut out at one side, as shown at 11, so that it will fit over the plug from the side.

At its outer end, the body member 9 has a transverse socket 12 in which is welded the end of a tubular stem 13. The bore 14 of said body ends at a head 15, in which is a central hole 16 leading to the interior of the stem 13. An annular sealing ridge 17 surrounds said hole on the inner face of the head 15. The end of the stem 13 is preferably plugged as shown at 18, before it is secured in the socket 12, to insure against leakage.

The body 9 is surrounded by an interiorly threaded nut 19 which engages and turns upon the threads 10. Said nut has a head 20 bored as at 21 to a loose fit on the shank of the plug 6 and is cut out at one side, as shown at 22, so that when the cut out portions or slots 11 and 22 coincide, the fitting can be slipped over the plug 6 from the side. The head 20 of the nut 19 has an inwardly directed flange 23 fitting loosely into the bore 14 of the body, and positioned for contact with the back of the plug flange 7. The nut 19 and its head 20 are preferably made as separate parts and welded as shown at 24. Together they form a locking member to hold the body in grease tight relation upon the plug. A handle 25 is welded to the nut at one side, as at 26, and has a stop lug 27 for contact with the stem 13.

The stem 13 can be any desired length, and has at its outer end a grease fitting 28 of standard form, to which a grease gun (not shown) may be connected.

The parts of the adapter are assembled in such a manner that when the locking handle 25 is parallel with the stem 13, as shown in Figs. 1 and 2, there is a clearance as shown at 29 between the locking member and the end of the body 9, and the cut out portions or slots 11 and 22, of the body and nut respectively, coincide. In this position the adapter can be fitted over the grease plug 6 from the side, the flange 7 of said plug fitting loosely beneath the flange 23 of the locking member head 20. The locking member is then turned by swinging the handle 25 about a quarter turn, or as much as may be necessary to tighten the head flange 23 against the plug flange 7 and to clamp the end of the plug against the sealing ridge 17. The adapter is thereby locked tightly upon the plug, and grease can be forced in, by a grease gun connected with the fitting 28, without leakage. Turning the handle 23 back to parallel position with the stem loosens the adapter so that it can be removed. The lug 27 on the handle, by contact with the stem, not only locates the open position of the locking member, but prevents it from being removed and lost.

I claim:

1. An adapter for connecting a grease gun to a grease plug, said plug having an axial passage through it, comprising a body member formed to partially surround the end portion of the plug and having one side cut out to form a slot, a locking member rotatably connected with said body, said locking member being formed to partially surround the plug and having one side cut out to form a slot, means for rotating said locking member upon said body to shift said slots into and out of registry, the body being slipped over the plug from the side when said slots are in registry and being held upon said plug when said slots are out of registry, said plug and said members having cooperating portions formed for mutual engagement to lock said body upon said plug in grease tight relation, a stem extending from said body in a direction approximately at right angles to the axis of said plug, said stem and said body having passages communicating with the passage of said plug, and a fitting on said stem formed for separable attachment with a grease gun.

2. An adapter for connecting a grease gun to a grease plug, said plug having a lateral projection and an end face and a passage through it from said end face, comprising a body member having a recess formed to fit over the plug and an end portion formed for grease tight contact with the end face of said plug, the end portion of said body having a passage registering with the plug passage and a portion of the side of said body being cut out to form a slot, screw threads on said body, a locking member having threads engaging the threads of said body, said locking member partially surrounding the plug and having a slot in its side movable into and out of registry with the body slot, the width of said slots being such that the body and the locking member can be slipped over the plug from the side, the locking member having a portion engaging the lateral projection of said plug when said locking member is screwed down on the body, a stem extending from said body, said stem having a passage communicating with the passage of said body, a fitting on said stem formed for separable attachment with a grease gun, and an arm secured to said locking member and positioned for engagement with said stem when said slots are in registry to limit further unscrewing movement of said locking member.

3. An adapter for connecting a grease gun to a grease plug, said plug having a passage through it, comprising a body member formed to fit over the plug, a locking member movably carried by said body to lock it on said plug, a stem connected with said body and extending laterally therefrom in a direction approximately at right angles to the axis of the plug, said stem and said body having a through passage communicating with the passage of said plug, a fitting on said stem formed for separable attachment with a grease gun, and an arm secured to said locking member and positioned to engage said stem to limit the movement of said locking member upon said body.

4. An adapter for connecting a grease gun to a grease plug, said plug having a passage through it, comprising a body member having a recess with a portion of its side cut out whereby it can be fitted over the plug from the side, a locking member movably carried by said body to lock it on said plug, a stem connected with said body and extending laterally therefrom in a direction approximately at right angles to the axis of the plug, said stem and said body having a through passage communicating with the passage of said plug, a fitting on said stem formed for separable attachment with a grease gun, and an arm secured to said locking member and positioned to engage said stem to limit the movement of said locking member upon said body.

5. An adapter for connecting a grease gun to a grease plug, said plug having a lateral projection and an end face and a passage through it from said end face, comprising a body member having a recess formed to fit over the plug and an end portion formed for grease tight contact with the end face of said plug, the end portion of said body having a passage registering with the plug passage and a portion of the side of said body being cut out to form a slot, screw threads on said body, a locking member having threads engaging the threads of said body, said locking member partially surrounding the plug and having a slot in its side movable into and out of registry with the body slot, the width of said slots being such that the body and the locking member can be slipped over the plug from the side, the locking member having a portion engaging the lateral projection of said plug when said locking member is screwed down on the body, cooperating members secured respectively to said body and said locking member and formed for mutual engagement when said slots are in registry to limit further unscrewing movement of said locking member, and means for separably connecting a grease gun with said body member, said means having a passage communicating with the passage of said body.

DANIEL ELMER DELANEY.